United States Patent
Kim et al.

(10) Patent No.: US 7,515,233 B2
(45) Date of Patent: Apr. 7, 2009

(54) LIQUID CRYSTAL DISPLAY HAVING DUAL PATTERN PROTRUSIONS FORMED ON AN ELECTRODE

(75) Inventors: Jang-Soo Kim, Suwon-si (KR); Min-Hyung Choo, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 556 days.

(21) Appl. No.: 11/094,147

(22) Filed: Mar. 31, 2005

(65) Prior Publication Data

US 2005/0231668 A1 Oct. 20, 2005

(30) Foreign Application Priority Data

Mar. 31, 2004 (KR) .................. 10-2004-0022054

(51) Int. Cl.
   *G02F 1/1337* (2006.01)
   *G02F 1/1339* (2006.01)
(52) U.S. Cl. .................. 349/123; 349/155; 349/156; 349/157
(58) Field of Classification Search .......... 349/123, 349/155–157
   See application file for complete search history.

(56) References Cited

U.S. PATENT DOCUMENTS

| | | | | |
|---|---|---|---|---|
| 5,754,003 | A * | 5/1998 | Murai et al. ............. | 313/582 |
| 2002/0033927 | A1 * | 3/2002 | Mun et al. ............... | 349/156 |
| 2002/0159010 | A1 * | 10/2002 | Maeda et al. ............ | 349/113 |
| 2003/0231272 | A1 * | 12/2003 | Nakamura et al. ....... | 349/123 |
| 2005/0024546 | A1 * | 2/2005 | Kubo et al. .............. | 349/33 |
| 2005/0140892 | A1 * | 6/2005 | Kim et al. ................ | 349/139 |
| 2007/0097278 | A1 * | 5/2007 | Rho et al. ................ | 349/12 |

FOREIGN PATENT DOCUMENTS

| | | |
|---|---|---|
| JP | 06-011711 | 1/1994 |
| JP | 07-084252 | 3/1995 |
| JP | 11-281972 | 10/1999 |
| JP | 2001-141915 | 5/2001 |
| JP | 2002162629 | 6/2002 |
| JP | 2007101952 | * 4/2007 |
| KR | 98-3697 | 3/1998 |
| KR | 1020020041279 | 6/2002 |
| KR | 1020030075539 | 9/2003 |

* cited by examiner

*Primary Examiner*—Julie Ngo
(74) *Attorney, Agent, or Firm*—F. Chau & Associates, LLC

(57) ABSTRACT

"A liquid crystal display of the present invention comprises a first substrate, a second substrate and a liquid crystal layer injected there between. The first substrate has first base plate, a gate line formed on the first base plate, a data line formed over the gate line, a switching element electrically connected to the gate line and the data line, a pixel electrode electrically connected to the switching element, an element dividing LC domains formed on the pixel electrode, first alignment layer formed on the domain dividing element. The second substrate comprises second base plate, a common electrode formed on the second base plate, a first protrusion and a second protrusion formed on the common electrode. The first protrusion and the second protrusion have different heights. A second alignment layer is formed on the protrusions."

15 Claims, 6 Drawing Sheets

LIQUID CRYSTAL DISPLAY HAVING DUAL PATTERN PROTRUSIONS FORMED ON AN ELECTRODE

CROSS-REFERENCE TO RELATED APPLICATIONS

This application claims benefit and priority of Korean Patent Application No. 2004-22054 filed on Mar. 31, 2004, the contents of which are herein incorporated by reference in its entirety.

BACKGROUND OF THE INVENTION

1. Field of the Invention

The present invention relates to a flat panel display and a method of manufacturing the flat panel display. More particularly, the present invention relates to a flat panel display that is effective in high contrast ratio characteristics.

2. Description of the Related Art

A liquid crystal display (LCD) realizes various images by virtue of the optical and dielectric anisotropy of the liquid crystal material. In LCDs, the quality of images depends on directions where it is viewed from.

To overcome the problem that image quality of LCD depends on the viewing direction, a vertically aligned (VA) LCD is strongly recommended these days.

In a VA LCD, liquid crystal molecules, which are between an upper substrate and a lower substrate, are aligned vertically against the surface of the substrates when electric field is not applied. When electric field is applied between the two substrates, the molecules of the liquid crystal (LC) rotate to the direction parallel with the surface of the two substrates.

To reduce the direction dependency of the images and to improve the quality of the image in VA LCD, a multi-domain technology is used. The multi-domain technology is to control the direction of molecules of the LC independently from one domain to another. Openings in electrodes or protrusions on electrodes are used to form multi-domains in VA LCDs. Some LCDs use one of the protrusions and the openings. Some LCDs use both of them.

The protrusions used to form multi-domains are made in the following process.

First, a photosensitive material is coated on a substrate. The photosensitive layer is exposed to an appropriate light through a mask that has a certain pattern.

The photosensitive layer is developed to form the above pattern.

The pattern of photosensitive layer becomes protrusions that form multi-domains.

In this case, the LC molecules on the protrusion is not aligned vertically but inclined to one side.

VA LCD is usually normally black mode which shows black state when electric field is not applied. In order to achieve a normally black mode, the LC molecule should align vertically when electric field is not applied. If some of the LC molecules are not aligned vertically, light will leak in the black state. This degrades the display quality.

SUMMARY OF THE INVENTION

An embodiment of the present invention provides an LCD that is effective in reducing the brightness in black state. The reduced brightness in black state will increase the contrast ratio (CR) which represents the ratio of the white luminance to the black luminance.

An embodiment of the present invention provides a method for manufacturing the above described LCD.

An embodiment of the present invention provides an LCD that comprises a substrate, an electrode formed on the substrate, a first protrusion and a second protrusion formed on the electrode, and an alignment layer formed on the first protrusion and on the second protrusion.

The first protrusion and the second protrusion may be formed in parallel.

The first protrusion and the second protrusion may extend in two or more directions.

The second protrusion may be formed on both side of the first protrusion and may be lower than the first protrusion.

An LCD of an embodiment of the present invention may be manufactured by forming an electrode on a substrate, forming a first protrusion and a second protrusion on the electrode with different heights, and forming an alignment layer on the protrusions.

The protrusion may be formed by coating a photo sensitive layer on the electrode, and exposing the photo sensitive layer to an appropriate light wave through a photo mask. The mask has two kinds of patterns for protrusions. One is wider than the other. The wider pattern may be for a higher protrusion. The narrower pattern may be for a lower protrusion.

DETAILED DESCRIPTION OF EMBODIMENTS

Figure 1:
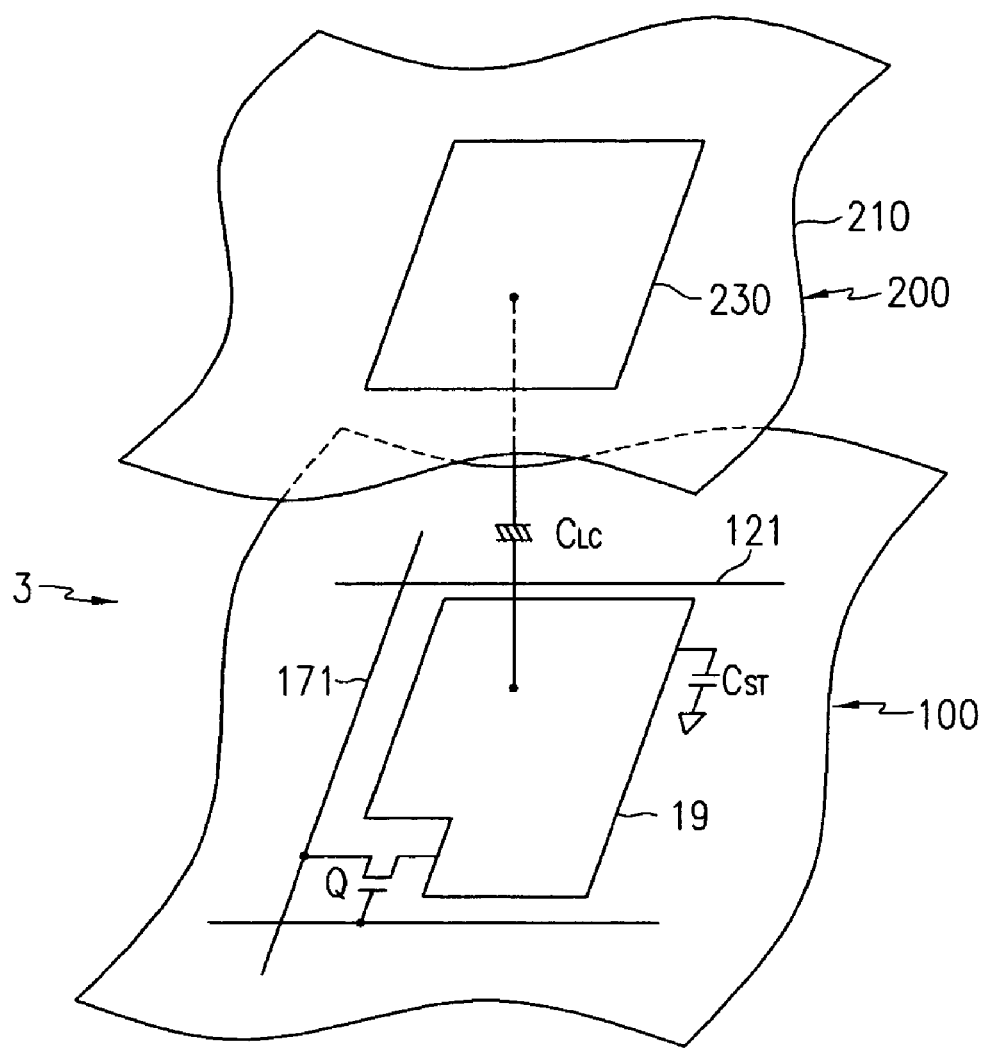
FIG. 1 is a brief drawing of an embodiment of the present invention.

It should be understood that the exemplary embodiments of the present invention described below may be varied in many different ways without departing from the inventive principles disclosed herein, and the scope of the present invention is therefore not limited to these particular following embodiments. Rather, these embodiments are provided so that this disclosure will be through and complete, and will fully convey the concept of the invention to those skilled in the art by way of example and not of limitation.

Hereinafter, the present invention will be described in detail with reference to the accompanying drawings.

In the drawings, thicknesses of the layers are exaggerated for ease of recognition.

FIG. 1 shows an LCD of an exemplary embodiment comprising a lower substrate 100, a upper substrate 200, and an LC layer 3 injected between the upper substrate and lower substrate.

The lower substrate 100 comprises a gate line 121, a data line 171 that crosses the gate line a thin film transistor (TFT) Q electrically coupled to the gate line and the data line, and a pixel electrode 19 electrically coupled to the TFT.

The upper substrate 200 comprises, a color filter 230 corresponding to the pixel electrode 19, and a common electrode 210 is deposited on the whole display area of the upper substrate 200 and receives common voltage.

The LC layer 3 may have negative dielectric anisotropy and may be vertically aligned to the surfaces of the upper substrate and the lower substrate.

LC molecules in the LC layer 3 tend to be aligned in a vertical direction to the electric field when the electric field is applied according to the voltage differences between the pixel electrode 19 and the common electrode 210.

The pixel electrode 19 on the lower substrate 100, the common electrode 210 on the upper substrate 200 and the LC layer form a capacitor ($C_{LC}$).

Figure 4:
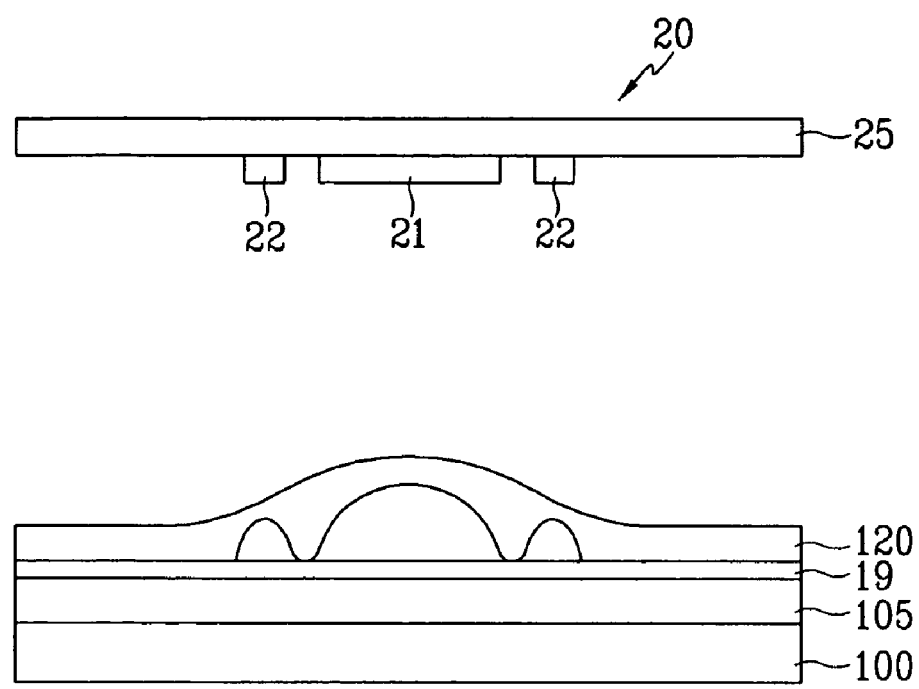
FIG. 4 is a cross-sectional view showing a structure of a dual pattern protrusion and photo mask to form the dual pattern protrusion of an embodiment of the present invention on the lower substrate.

Referring to FIG. 4, the pixel electrode 19 forms storage capacitor ($C_{ST}$) with another signal line (not shown) with a certain voltage applied thereon. The certain voltage may be same to the common voltage. The pixel electrode 19 may also form a storage capacitor with previous gate line and insulation layer 105 formed between the pixel electrode 19 and the gate signal line.

Color filter 230 may be formed on the lower substrate 100. In such a case, it can be above or below the pixel electrode.

Figure 3:
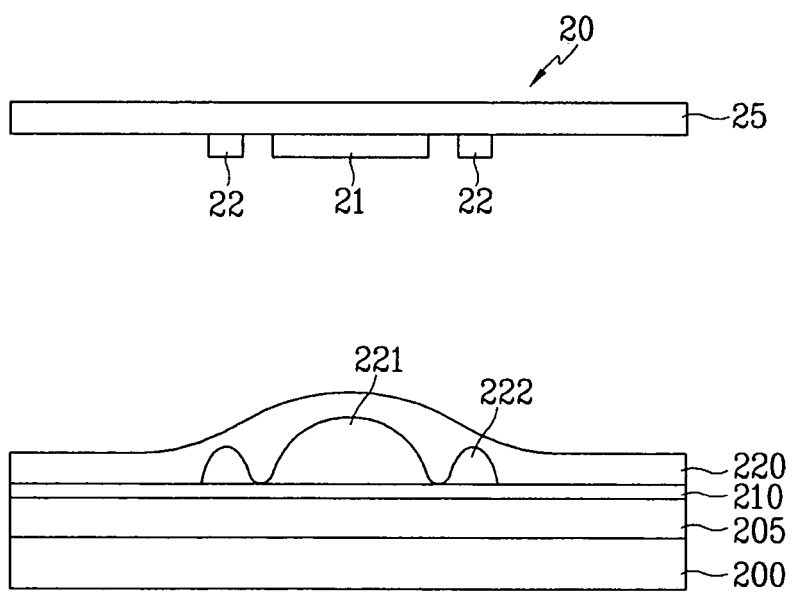
FIG. 3 is a cross-sectional view showing a structure of dual pattern protrusion and a photo mask to form the dual pattern protrusion of an embodiment of the present invention on the upper substrate.

FIG. 3 is a cross-sectional view showing a dual pattern protrusion and a photo mask to form the dual pattern protrusion as an embodiment of the present invention.

FIG. 3 shows an upper substrate 200, an insulation layer 205, an electrode 210, a first protrusion 221 and a second protrusion 222, and an alignment layer 220. First protrusion 221 is higher than the second protrusion 222. The second protrusion 222 is formed at both side of the first protrusion 221. The first protrusion 221 is between about 4 μm and 6 μm wide, and the second protrusion 222 is from about 1.5 μm to about 2.5 μm wide. The first protrusion is separated from the second protrusion about 5 μm to about 6 μm when measured from center to center. The alignment layer 220 may be vertically aligning material. The insulation layer 205 may be an overcoat layer. The insulation layer may be omitted.

FIG. 3 shows a mask 20 having a transparent substrate 25, the first pattern 21 and the second pattern 22.

Herein the first pattern 21 faces the first protrusion 221, and the second pattern 22 faces the second protrusion 222.

The first pattern 21 may be wider than the second pattern 22.

The first pattern 21 is from about 4 μm to about 6 μm wide and the second pattern 22 is from about 1.5 μm to about 2.5 μm wide. The first pattern 21 and the second pattern 22 are separated apart from about 1.5 μm to about 2.5 μm.

The process forming protrusions on the common electrode is described below.

Light shielding layer is formed on a substrate like a glass plate to block light leakage between pixel electrodes. Then the color filter is formed on the light shielding layer. Overcoat layer may be formed on the color filter. Next, a common electrode 210 is formed on the overcoat layer 205. Then, a photo sensitive material is coated on the common electrode. After that, the photo sensitive material is exposed to a light wave through the photo mask described in FIG. 3. The first protrusion 221 is formed on the position corresponding to the first pattern 21. The second protrusion 222 is formed on the position corresponding to the second pattern 22. An alignment layer 220 like polyimide resin is coated on the first protrusion and the second protrusion.

FIG. 4 shows that a similar process can be applied to the lower substrate including a lower substrate 100, an insulation layer 105, a pixel electrode 19 to form protrusions and an alignment layer 120 formed thereon.

As shown in FIG. 3 and FIG. 4 the width of the first pattern and the second pattern on the mask is different from each other. Even though a pattern on the mask shield light from reaching to the shade area, light is diffracted to the shade area. A wider light shielding pattern on a mask may block light from reaching the center area of the shadow. The less light reaches the photosensitive layer the thicker pattern is formed.

Because protrusions are formed by using the photo mask of an embodiment of the present invention which has the first pattern 21 and the second pattern 22 in the FIG. 3, and the alignment layer smooth the slopes of the protrusions, the whole area of the protrusions changes gently. When electric field is not applied to the LC layer, the LC molecules in the vicinity of the protrusions 221 and 222 are aligned almost vertically to the substrate surface.

Accordingly, when protrusions are used as a means for forming domains in a normally black mode LCD, the light leakage in the vicinity of the protrusions is improved.

Luminance of the black and white and the contrast ratios are shown in the Table 1.

Figure 5:
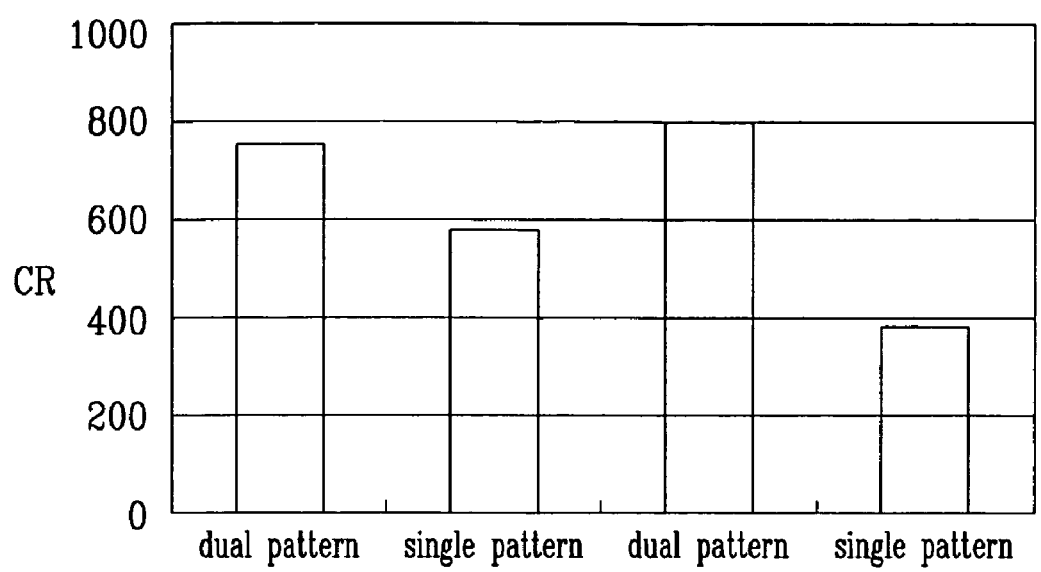
FIG. 5 is a graph comparing the contrast ratio (CR) of the LCDs made by an embodiment of the present invention and by the prior art.

FIG. 5 is a graph comparing the contrast ratio (CR) of the LCDs made by the present invention and by the prior art. The Table 1 shows the result when the first pattern 21 in the mask (CD, critical dimension) is 5 μm wide, the second pattern 22 in the mask (CD, critical dimension) is 2 μm wide, the distance from the first pattern 21 to the second pattern 22 is 2 μm, and the CD of the prior art (single pattern protrusion) is 14 μm.

TABLE 1

| | Application of Overcoat layer | | | Non-application of Overcoat | | |
|---|---|---|---|---|---|---|
| | B | W | CR | B | W | CR |
| Dual Pattern | 0.58 | 446.4 | 764.4 | 0.56 | 451.5 | 803.4 |
| Single pattern | 0.72 | 424.4 | 586.2 | 1.10 | 418.3 | 380.6 |

Table 1 and FIG. 5 shows that LCDs with dual pattern protrusions show much better black luminance and contrast ratio than the LCDs with single pattern protrusion regardless of the overcoat layer. The mask for dual pattern protrusions has two kinds of patterns whose width is different from each other as shown in FIG. 3 and FIG. 4.

Figure 2:
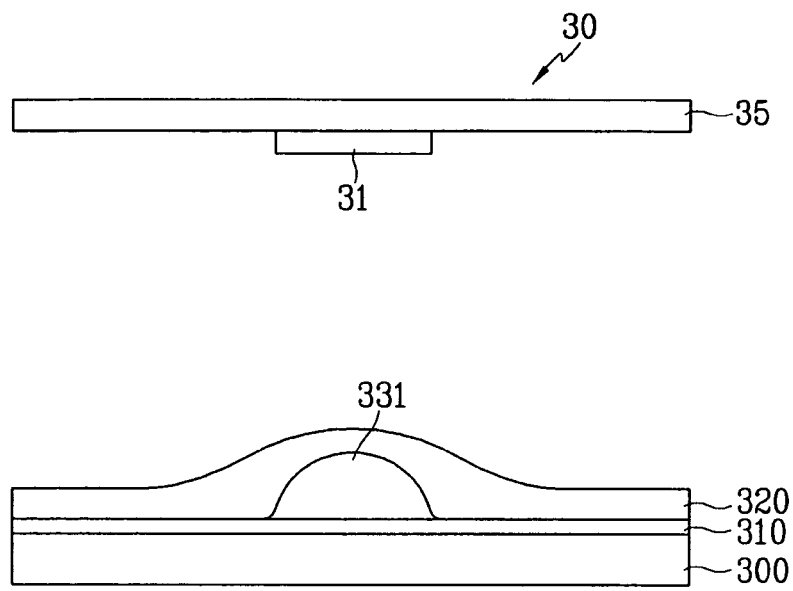
FIG. 2 is a cross-sectional view showing protrusions and photo mask to form the protrusions in the prior art.

FIG. 2 shows a single pattern protrusion and its forming process that has been conventionally used. An electrode 310 is formed on a substrate 300. A single pattern protrusion 331 is formed on the electrode 310 by using a photo mask 30. The photo mask 30 comprises a transparent plate 35 and an opaque pattern 31. The opaque pattern corresponds to the protrusion pattern 331. In this example the protrusion 331 is made of positive photo resist. An alignment layer 320 is formed later on the electrode 310 and the protrusion 331.

Figure 6:
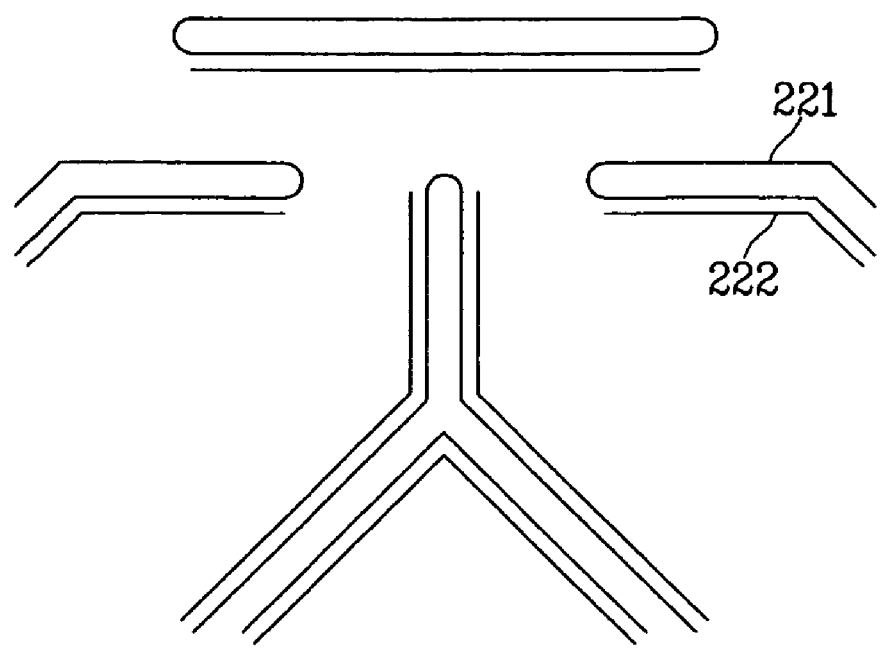
FIG. 6 is a plan view showing dual pattern protrusions of an embodiment of the present invention.

FIG. 6 is a plan view showing dual pattern protrusions made by an embodiment of the present invention.

A first protrusion 221 and a second protrusion 222 extend parallel with each other. The second protrusion 222 can be either at both sides of the first protrusion 221 or at one side of the first protrusion 221.

Figure 7:
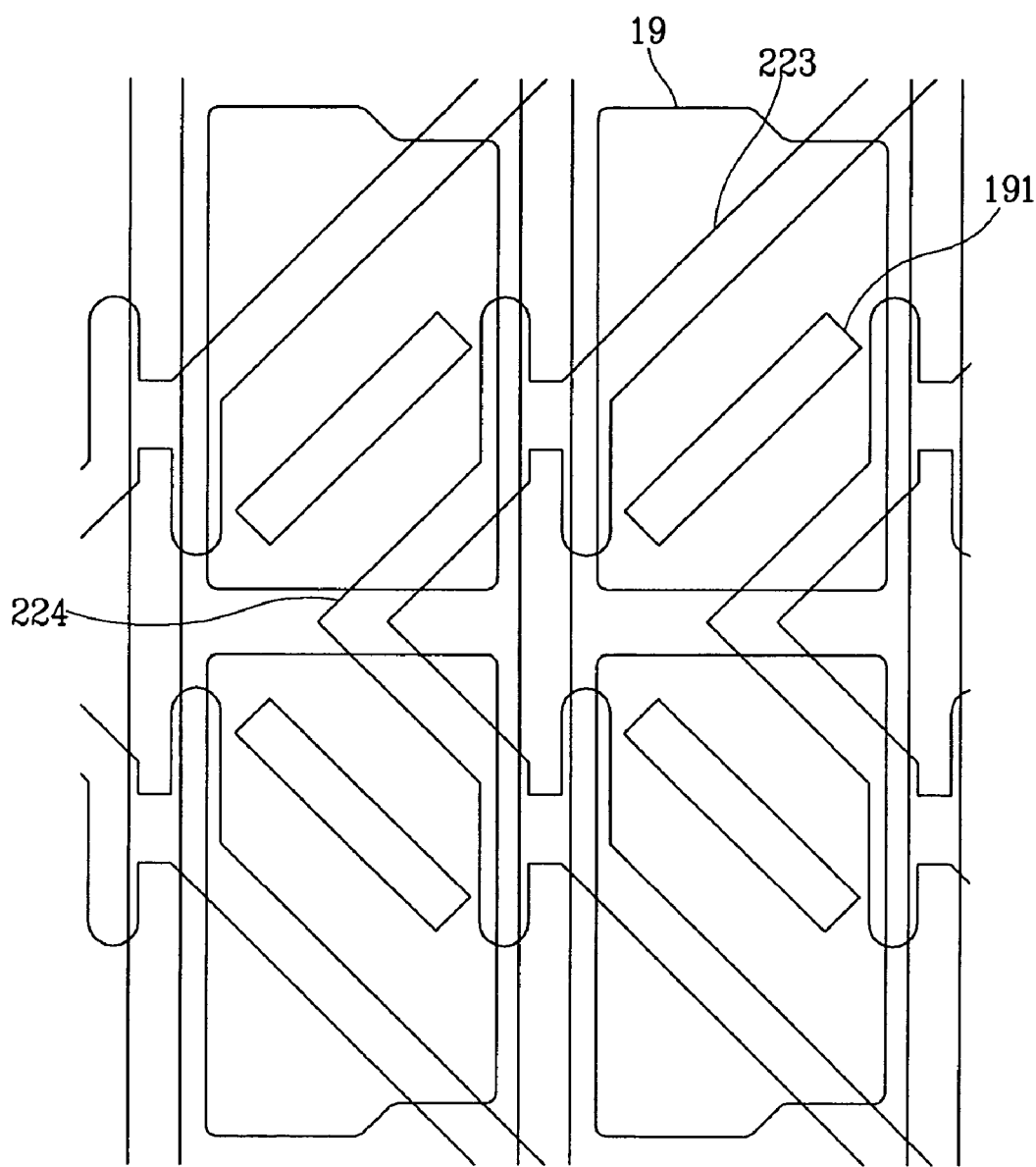
FIG. 7 is a plan view showing a protrusion pattern formed on the electrode of an embodiment of the present invention.

FIG. 7 is a plan view showing a protrusion pattern formed on the electrode of an embodiment of the present invention.

As shown in the FIG. 1 and the FIG. 7, an embodiment of the present invention has an open portion of the pixel electrode 191 on a lower substrate 100 and protrusions 223 and 224 on the common electrode 210 of the upper substrate 200. The protrusions 223 and 224 have different heights.

The protrusions 223 and 224 have a bending portion and a vertical portion connected to the both sides of the bending portion.

The bending portion has two inclined lines that meet each other at almost a right angle.

The vertical portion makes an obtuse angle with the bending portion and almost corresponds to the edge of the pixel electrode 19.

The bending portion of the bigger protrusion 223 traverses slantingly the whole width of the pixel electrode 19. The bending portion of the smaller protrusion 224 traverses slantingly half of the whole width of the pixel electrode 19.

In the horizontal direction of the pixel electrode 19, the bigger protrusion 223 and the smaller protrusion 224 are disposed alternately. The bigger protrusion 223 and the smaller protrusion 224 are parallel with each other. There is an open portion 191 between the bigger is protrusion 223 and the smaller protrusion 224. The open portion 191 is parallel to the bigger protrusion 223 and the smaller protrusion 224. In the FIG. 7, the bigger protrusion 223 is connected to the smaller protrusion 224 of the adjacent pixel electrode 19, but they may be separated.

The opening 191 of the pixel electrode 19 may be substituted by a protrusion.

The LC molecules of both side of the openings 191 and the protrusions 223 and 224 slant the opposite directions to each other.

Because the openings 191 and the protrusions 223 and 224 have a bending portion bent almost 90 degree, the LC molecules on the portion of a pixel electrode slant four directions which reduce the viewing dependency of the quality of an LCD.

The light shielding pattern and the color filter may be formed on the lower substrate. In such a case, they may locate above or below the pixel electrode. The overcoat may be omitted.

According to an embodiment of the present invention, the dual pattern protrusion may have dual height. The wider pattern may be higher than the narrower pattern. The dual height protrusion may be formed on the pixel electrode in the same way as formed on the common electrode. The dual height protrusion may be formed on both substrates or on one of the two substrates. In this case, the electrode on the other substrate may have an opening.

The dual height protrusion smoothes the slope of the whole protrusion and can improve the quality of the black state and the contrast ratio of an LCD.

An exemplary embodiment of the present invention also shows that the dual pattern protrusion may be a triplet or more pattern protrusion. The dual height protrusion may have more than two sub-protrusions with heights different from each other.

Here are some examples of the experiment using embodiments of the present invention. We coated photo resist (PR) PC459 produced by Japan Synthetic Rubber (JSR) on an electrode formed on a glass substrate with 850 rpm for 20 seconds. Then the PR was dried with a 90° C. hot plate for 10 seconds in proximity, after that the PR was dried for 120 seconds on the plate. After the PR was exposed to a Hg light with about 420 nm ~500 nm wave length range through a photo mask, it was developed with 2.38% tetra methyl ammonium hydroxide (TMAH; $N(CH_3)_4OH$) solution. The second pattern 22 of FIG. 3 was 2 μm wide. The first pattern was split to 5 μm, 7.5 μm, and 10 μm wide each. The distance between the first pattern and the second pattern was split to 1.3 μm, 1.5 μm, and 2.0 μm each. Some prior art also were tested with single pattern, and it was split to 8 μm, 11 μm, and 14 μm each. The first protrusion 221 in FIG. 3 was about 1.1 μm thick, and the second protrusion 222 in FIG. 3 was about 0.4 μm. All of the displays of dual pattern protrusions showed better CR than any of the displays of single pattern protrusions. When the first pattern is equal to or closer than 1.3 μm to the second pattern on the mask, the first protrusion may reach to the second protrusion on the substrate. Even the first protrusion and the second protrusion reach each other, CR of the display is better than prior arts. If the viscosity of an alignment layer is low, reaching the first protrusion to the second protrusion may be better. In this case, the dual pattern protrusions look like a single pattern protrusion. If the viscosity of an alignment layer is big enough, the alignment layer can smooth the slop of the dual pattern protrusion. The second pattern on the mask may be half tone pattern instead of a slit pattern. The half tone pattern transmits light less than the first pattern on the mask.

Though the embodiments of the present disclosure shows only positive type PR, a negative type PR can be used.

This invention has been described with reference to the exemplary embodiments. It is evident, however, that many alternative modifications and variations will be apparent to those skilled in the art in light of the foregoing description. Accordingly, the present invention embraces all such alternative modifications and variations as fall within the spirit and scope of the appended claims.

What is claimed is:

1. A liquid crystal display, comprising:
   a base plate;
   an electrode formed on the base plate;
   a plurality of protrusion pairs, each protrusion pair comprising a first protrusion and a second protrusion with different heights and formed on the electrode;
   an alignment layer formed on the first protrusion and the second protrusion,
   wherein
   a distance between the first protrusion and the second protrusion in the protrusion pair is shorter than a distance between the protrusion pairs.

2. The liquid crystal display of claim 1, wherein the first protrusion and the second protrusion extend parallel with each other.

3. The liquid crystal display of claim 2,
   wherein the first protrusion and the second protrusion extend in more than one direction.

4. The liquid crystal display of claim 2,
   wherein the second protrusion is adjacent to the first protrusion and the second protrusion is lower than the first protrusion.

5. The liquid crystal display of claim 1,
   wherein the second protrusion is adjacent to the first protrusion and is narrower than the first protrusion.

6. The liquid crystal display of claim 5,
   wherein the first protrusion is from about 4 μm to about 6 μm wide, the second protrusion is from about 1.5 μm to about 2.5 μm wide and the first protrusion and the second protrusion are apart from each other about 5 μm to about 6 μm when measured from center to center.

7. The liquid crystal display of claim 1,
   wherein the electrode is a common electrode extending completely over a display area of the liquid crystal display.

8. The liquid crystal display of claim 1, wherein the electrode is a pixel electrode, and a plurality of pixels electrodes are formed on the base plate.

9. The liquid crystal display of claim 8, further comprising:
a gate line formed on the base plate;
a data line formed on the base plate across the gate line; and
a switching element electrically coupled to the gate line, the data line and a corresponding pixel electrode of the plurality of pixel electrodes.

10. A liquid crystal display, comprising;
a first base plate;
a gate line formed on the first base plate;
a data line formed on the first base plate across the gate line;
a switching element electrically coupled to the gate line and the data line;
a pixel electrode electrically coupled to the switching element;
a first alignment layer formed on the pixel electrode;
a second base plate;
an opposing electrode formed on the second base plate;
a plurality of protrusion pairs, each protrusion pair comprising a first protrusion and a second protrusion with different heights and formed on the opposing electrode;
a second alignment layer formed on the first protrusion and the second protrusion; and
a liquid crystal layer injected between the first base plate and the second base plate, wherein a distance between the first protrusion and the second protrusion in the protrusion pair is shorter than a distance between the protrusion pairs.

11. The liquid crystal display of claim 10,
wherein the first protrusion is adjacent to the second protrusion.

12. The liquid crystal display of claim 11,
wherein the second protrusion is lower than the first protrusion.

13. The liquid crystal display of claim 12,
wherein the first alignment layer and the second alignment layer are vertical alignment layers:
the liquid crystal layer has a negative dielectric anisotropy; and
the liquid crystal display shows a normally black mode.

14. The liquid crystal display of claim 10,
wherein the first alignment layer and the second alignment layer are vertical alignment layers; and
wherein the liquid crystal layer has a negative dielectric anisotropy.

15. The liquid crystal display of claim 14, wherein the liquid crystal display shows a normally black mode.

* * * * *